United States Patent
Morris

(10) Patent No.: US 8,936,146 B2
(45) Date of Patent: Jan. 20, 2015

(54) CONVEYOR CHAIN

(71) Applicant: Randall L. Morris, Cincinnati, OH (US)

(72) Inventor: Randall L. Morris, Cincinnati, OH (US)

(73) Assignee: The Cincinnati Mine Machinery Company, Cincinnati, OH (US)

( * ) Notice: Subject to any disclaimer, the term of this patent is extended or adjusted under 35 U.S.C. 154(b) by 40 days.

(21) Appl. No.: 13/908,343

(22) Filed: Jun. 3, 2013

(65) Prior Publication Data

US 2013/0264177 A1 Oct. 10, 2013

Related U.S. Application Data

(63) Continuation-in-part of application No. 12/559,799, filed on Sep. 15, 2009, now Pat. No. 8,453,826.

(60) Provisional application No. 61/098,870, filed on Sep. 22, 2008, provisional application No. 61/234,398, filed on Aug. 17, 2009.

(51) Int. Cl.
*B65G 19/08* (2006.01)
*B65G 19/24* (2006.01)
*B65G 15/48* (2006.01)
(Continued)

(52) U.S. Cl.
CPC .............. *B65G 15/48* (2013.01); *B65G 19/08* (2013.01); *B65G 19/20* (2013.01); *B65G 19/24* (2013.01); *B65G 23/06* (2013.01); *B65G 2812/0297* (2013.01)
USPC ............ 198/731; 198/730; 198/734; 198/733

(58) Field of Classification Search
None
See application file for complete search history.

(56) References Cited

U.S. PATENT DOCUMENTS 1,028,893 A 6/1912 Luther
1,694,275 A 12/1928 Clifford
(Continued)

FOREIGN PATENT DOCUMENTS

CA 2659730 A1 10/2009
DE 1166720 B 4/1964
(Continued)

OTHER PUBLICATIONS

"Product—Introduction—DA-3502-A, Our new chain offers great benefits for the mining industry", Mining Media International Journal (Aug. 28, 2009).

(Continued)

*Primary Examiner* — Kavel Singh
(74) *Attorney, Agent, or Firm* — Wood, Herron & Evans, LLP

(57) ABSTRACT

A version of a conveyor chain that comprises: a plurality of side link assemblies, each said side link assembly comprising: two connecting pins and two side straps, wherein each side strap has a base and two side strap bosses extending from the base and wherein each side strap boss is capable of receiving one of said connecting pins; a plurality of connector assemblies; a plurality of flight arm assemblies, each said flight arm assembly comprising: two flight pins and two flight arms, wherein each flight arm has an elongated portion having a flat, planar bottom surface, and a base portion, wherein said base portion has a vertical sprocket opening and two flight arm attachment apertures, each flight arm attachment aperture configured to receive one of said flight pins; wherein each universal connector assembly is adapted to be connected to a side link assembly and a flight arm assembly, to form an endless chain.

20 Claims, 14 Drawing Sheets

(51) Int. Cl.
B65G 19/20 (2006.01)
B65G 23/06 (2006.01)

(56) References Cited

U.S. PATENT DOCUMENTS

| | | | |
|---|---|---|---|
| 1,790,297 A | 1/1931 | Alger | |
| 1,920,500 A | 8/1933 | Garcia | |
| 2,068,666 A | 1/1937 | Dunlop | |
| 2,091,836 A | 8/1937 | Haaf et al. | |
| 2,297,813 A | 10/1942 | Stork | |
| 2,391,485 A | 12/1945 | Simmons | |
| 2,398,107 A | 4/1946 | Morrow | |
| 2,569,584 A | 10/1951 | Shepherd | |
| 2,600,174 A | 6/1952 | William | |
| 2,613,546 A | 10/1952 | Erland | |
| 2,672,971 A | 3/1954 | Joy | |
| 2,674,365 A | 4/1954 | Russell | |
| 2,756,867 A | 7/1956 | Russell | |
| 2,756,868 A | 7/1956 | Russell | |
| 2,756,869 A | 7/1956 | John | |
| 2,781,187 A * | 2/1957 | Russell | 299/67 |
| 2,922,511 A | 1/1960 | Ruppe | |
| 2,994,422 A | 8/1961 | Dalrymple | |
| 3,026,737 A | 3/1962 | Berg | |
| 3,086,404 A | 4/1963 | Krekeler | |
| 3,093,235 A | 6/1963 | Imse | |
| 3,103,275 A | 9/1963 | Rollins | |
| 3,155,225 A | 11/1964 | Krekeler | |
| 3,324,990 A | 6/1967 | Karlovsky, Jr. | |
| 3,463,026 A | 8/1969 | Macpherson | |
| 3,584,734 A | 6/1971 | Richards et al. | |
| 3,641,831 A | 2/1972 | Palmaer | |
| 3,646,752 A | 3/1972 | Kampfer | |
| 3,653,491 A * | 4/1972 | Safko et al. | 198/733 |
| 3,679,265 A | 7/1972 | Krekeler | |
| 3,748,917 A | 7/1973 | Berg | |
| 3,762,535 A | 10/1973 | Becker et al. | |
| 3,841,707 A | 10/1974 | Kniff et al. | |
| 3,888,133 A | 6/1975 | Krekeler | |
| 3,952,860 A | 4/1976 | Specht | |
| 3,957,153 A | 5/1976 | Krekeler | |
| 3,961,702 A | 6/1976 | Blok | |
| 4,238,028 A | 12/1980 | Lake | |
| 4,265,084 A | 5/1981 | Livesay | |
| 4,339,031 A | 7/1982 | Densmore | |
| 4,441,605 A | 4/1984 | Ronco et al. | |
| 4,476,975 A | 10/1984 | Densmore | |
| 4,667,813 A | 5/1987 | Densmore | |
| 4,674,803 A | 6/1987 | Sterwerf, Jr. | |
| 4,717,206 A | 1/1988 | Sterwerf, Jr. | |
| 4,766,995 A | 8/1988 | Sterwerf, Jr. | |
| 4,773,528 A | 9/1988 | Anderson et al. | |
| 4,813,530 A | 3/1989 | Wechner | |
| 4,828,339 A | 5/1989 | Thomas et al. | |
| 4,856,384 A | 8/1989 | Wechner | |
| 4,865,184 A | 9/1989 | Wechner | |
| 4,865,185 A | 9/1989 | Bodimer | |
| 4,897,904 A | 2/1990 | Cowles | |
| 4,915,455 A | 4/1990 | O'Neill et al. | |
| 4,917,232 A | 4/1990 | Densmore | |
| 4,919,252 A | 4/1990 | Wechner | |
| 4,932,481 A | 6/1990 | Wechner | |
| 4,944,560 A | 7/1990 | Osterwise | |
| 4,947,535 A | 8/1990 | Cowles | |
| 5,000,310 A | 3/1991 | Edmondson | |
| 5,004,098 A | 4/1991 | Marshall | |
| 5,011,229 A | 4/1991 | O'Neill et al. | |
| 5,026,218 A | 6/1991 | Zimmerman | |
| 5,072,826 A | 12/1991 | Wechner | |
| 5,088,594 A | 2/1992 | Edmondson | |
| 5,088,797 A | 2/1992 | O'Neill | |
| 5,106,166 A | 4/1992 | O'Neill | |
| 5,156,256 A | 10/1992 | David | |
| 5,161,670 A | 11/1992 | David | |
| 5,163,545 A | 11/1992 | David | |
| 5,165,766 A | 11/1992 | Thomas | |
| 5,186,526 A | 2/1993 | Pennington | |
| 5,242,358 A | 9/1993 | Cowles | |
| 5,254,047 A | 10/1993 | Anderson | |
| 5,285,736 A | 2/1994 | Sturniolo | |
| 5,302,005 A | 4/1994 | O'Neill | |
| 5,348,130 A | 9/1994 | Thomas | |
| 5,404,997 A | 4/1995 | Schreier et al. | |
| 5,518,299 A | 5/1996 | Adamczyk et al. | |
| 5,597,393 A | 1/1997 | Johnson et al. | |
| 5,692,807 A | 12/1997 | Zimmerman | |
| 5,725,283 A | 3/1998 | O'Neill | |
| 5,795,032 A | 8/1998 | Zimmerman | |
| 5,811,976 A | 9/1998 | Fischer | |
| 5,873,431 A | 2/1999 | Butler et al. | |
| 5,950,673 A | 9/1999 | Elliott-Moore | |
| 6,007,157 A | 12/1999 | Stewart | |
| 6,148,954 A | 11/2000 | Harris | |
| 6,161,684 A | 12/2000 | David | |
| 6,170,848 B1 | 1/2001 | Wechner | |
| 6,216,852 B1 | 4/2001 | David | |
| 6,224,164 B1 | 5/2001 | Hall et al. | |
| 6,302,623 B1 | 10/2001 | Nellson | |
| 6,325,460 B1 | 12/2001 | Frederick | |
| 6,364,148 B1 | 4/2002 | Neilson et al. | |
| 6,386,640 B1 | 5/2002 | Neilson | |
| 6,401,914 B1 | 6/2002 | Greve | |
| 6,497,536 B1 | 12/2002 | Neilson et al. | |
| 6,530,537 B2 | 3/2003 | Hanlon | |
| 6,565,162 B2 | 5/2003 | Stewart | |
| 6,571,936 B1 | 6/2003 | Melhuish et al. | |
| 6,602,026 B1 | 8/2003 | Neilson | |
| 6,651,804 B2 | 11/2003 | Thomas et al. | |
| 6,662,932 B1 | 12/2003 | O'Neill | |
| 6,729,464 B2 | 5/2004 | Thomas et al. | |
| 6,764,141 B2 | 7/2004 | O'Neill | |
| 6,796,388 B2 | 9/2004 | O'Meley | |
| 6,814,155 B1 | 11/2004 | Nielson et al. | |
| 6,890,037 B2 | 5/2005 | Stewart | |
| 7,005,576 B2 | 2/2006 | Niederriter et al. | |
| 7,115,822 B1 | 10/2006 | Day et al. | |
| 7,201,062 B2 | 4/2007 | Hill et al. | |
| 7,467,510 B2 | 12/2008 | Tout et al. | |
| 7,523,687 B2 | 4/2009 | Tout | |
| 7,607,866 B2 | 10/2009 | Eddowes et al. | |
| 8,016,102 B2 | 9/2011 | Morris | |
| 8,177,049 B2 | 5/2012 | O'Neill | |
| 8,448,781 B2 | 5/2013 | Morris | |
| 8,453,826 B2 | 6/2013 | Morris | |
| 2009/0250318 A1* | 10/2009 | O'Neill | 198/731 |

FOREIGN PATENT DOCUMENTS

| | | |
|---|---|---|
| EP | 0618381 A1 | 10/1994 |
| GB | 868605 A | 5/1961 |
| GB | 1054399 A | 1/1967 |
| GB | 1537876 A | 1/1979 |
| GB | 2215006 A | 9/1989 |
| WO | 2002028750 | 4/2002 |

OTHER PUBLICATIONS

One-Page Drawing Page X9018H—Prior art chain.
The DA-450 Conveyor Chain internal memo dated Oct. 3, 2000 listing experiment dates.

* cited by examiner

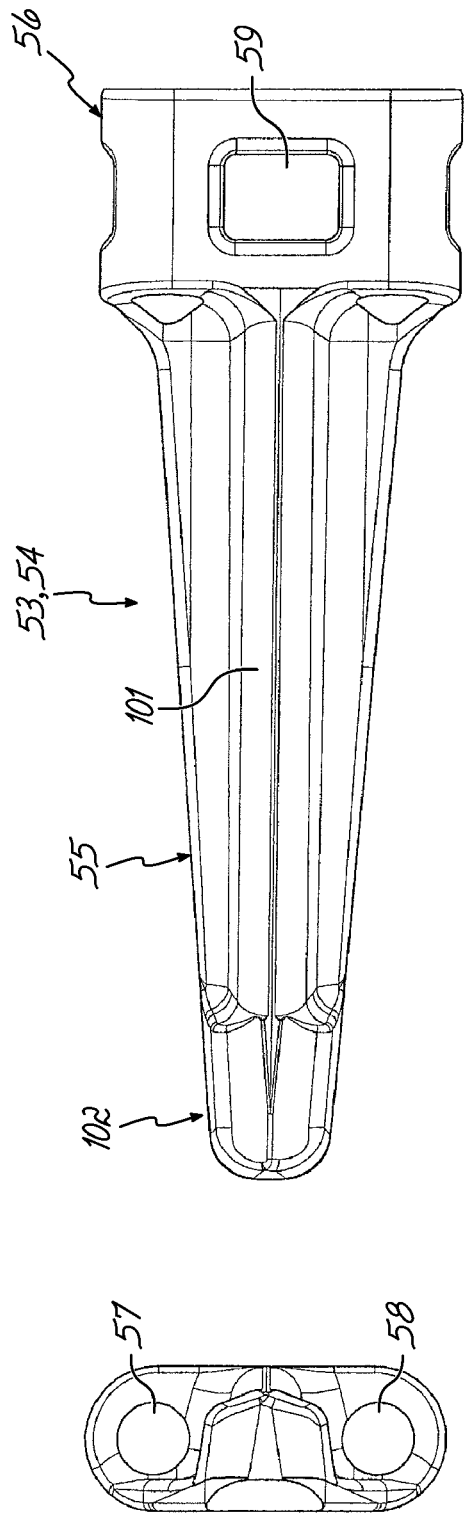
FIG. 9
FIG. 11
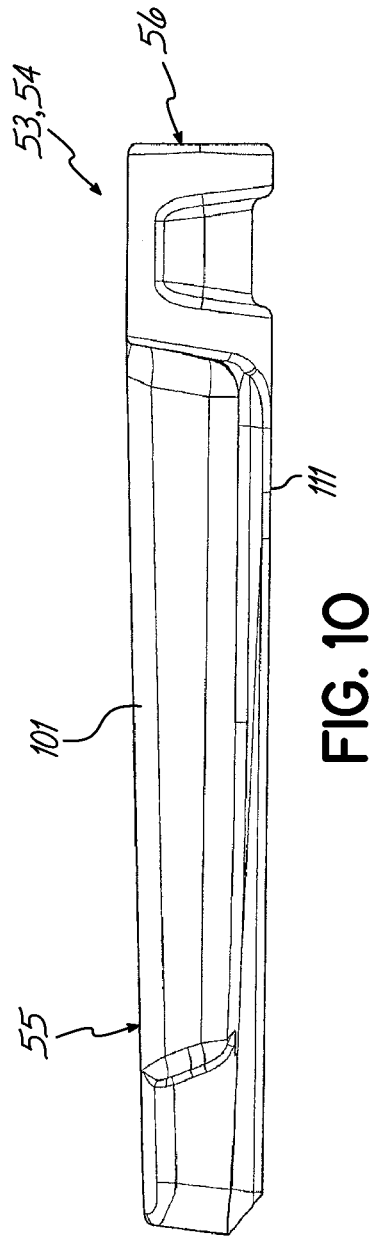
FIG. 10

CONVEYOR CHAIN

PRIORITY

This application is a continuation-in-part application to U.S. patent application Ser. No. 12/559,799, entitled Conveyor Chain and filed Sep. 15, 2009, which application claims priority to U.S. Provisional Patent Application Ser. No. 61/098,870, filed Sep. 22, 2008, entitled "Conveyor Chain," and U.S. Provisional Patent Application Ser. No. 61/234,398, filed Aug. 17, 2009, entitled "Conveyor Chain," the applications and disclosures of which are incorporated by reference herein in their entireties.

BACKGROUND

Pusher-type chain conveyors, as used in the mining industry, are found both in the form of separate conveying units, and as integral parts of continuous mining machines. One example of a continuous mining machine is a self-propelled mining machine. It is provided at its forward end with cutting means shiftable in such a way that an entry is cut in the material being mined. The entry is so sized as to permit passage of the mining machine therethrough. Since the cutting operation is a continuous one, it is advantageous to provide means to move the cut material from in front of the mining machine and to convey it out of the entry.

One or several conveyors may be incorporated into the mining machine's construction that acts successively to transport the cut material rearwardly from the machine. One example of a conveyor that is incorporated into the mining machine extends from the front to the rear of the machine. The purpose of this conveyor is to remove the cut material from entry and deliver the cut material to other conveying means. The other conveying means may comprise mine cars or other vehicles used for hauling, portable belt conveyors or other conveyors designed for loading and unloading mined material from the mining machine, or the like.

An example of a conveyor that has been encountered in association with a continuous mining machine includes a section of conveyor base means mounted on the mining machine body. One or more additional sections of conveyor base means are connected thereto end-to-end, and extend beyond the rearward end of the mining machine body. All of the base means sections are characterized by a bottom portion provided with longitudinally extending, upstanding side guides or flanges. The various sections of the tail conveyor can be capable of both lateral and vertical movement with respect to each other, which enables the cut material to be delivered to a desired point despite changes of position of the mining machine as it advances in the entry and changes in level of the entry floor. The lateral and vertical movement capability of the conveyor sections may also enable the shifting of the desired delivery point for the material being mined, as required.

This type of conveyor may incorporate a continuous pusher-type conveyor chain, which is driven along the length of the conveyor base sections. The chain may be provided with a plurality of rigid pusher elements, normally extending substantially transversely of the conveying direction. The pusher elements are located at spaced intervals along the chain. Adjacent pusher elements may be joined together by a series of alternate block-like links and plate-like links. At one end of the machine's conveyor, the continuous chain passes over a driven sprocket. At the other end of the conveyor, the chain passes over a driven or idler sprocket, or roller.

Various embodiments of a conveyor chain configured to be used in conjunction with a dual drive sprocket on a mining machine are disclosed in the following applications: U.S. Provisional Patent Application No. 60/238,877, filed Oct. 6, 2000; PCT Patent Application Serial No. PCT/US01/31746, filed Oct. 9, 2001; and U.S. Nonprovisional patent application Ser. No. 10/398,387, which was filed on Apr. 7, 2003 and is now issued as U.S. Pat. No. 8,016,102; the disclosures of which are incorporated by reference herein.

Typically in the underground mining industry, machine downtime is very expensive. Should a conveyor chain fail (due to sudden impact or wear), the chain often would come apart during production causing several hours of expensive and unproductive downtime while the chain was repaired. Most often a conveyor chain fails from impact loads on the flight arms. These impacts over time cause a fracture which then causes the welded-in pins to fail.

Accordingly, it is desirable to provide a conveyor chain that has specific features and structures to provide a robust design which will not fail under rigorous usage.

BRIEF DESCRIPTION OF THE DRAWINGS

The accompanying drawings, which are incorporated in and constitute a part of this specification, illustrate speech recognition system components and embodiments of the invention and, together with the detailed description of the embodiments given below, serve to explain the principles of the invention.

FIG. 9 depicts a top plan view of an exemplary flight arm of an embodiment of the invention.

FIG. 10 depicts a side elevation view of the exemplary flight arm of FIG. 9 of an embodiment of the invention.

FIG. 11 depicts an end view of the exemplary flight arm of FIG. 9 of an embodiment of the invention.

Figure 1:
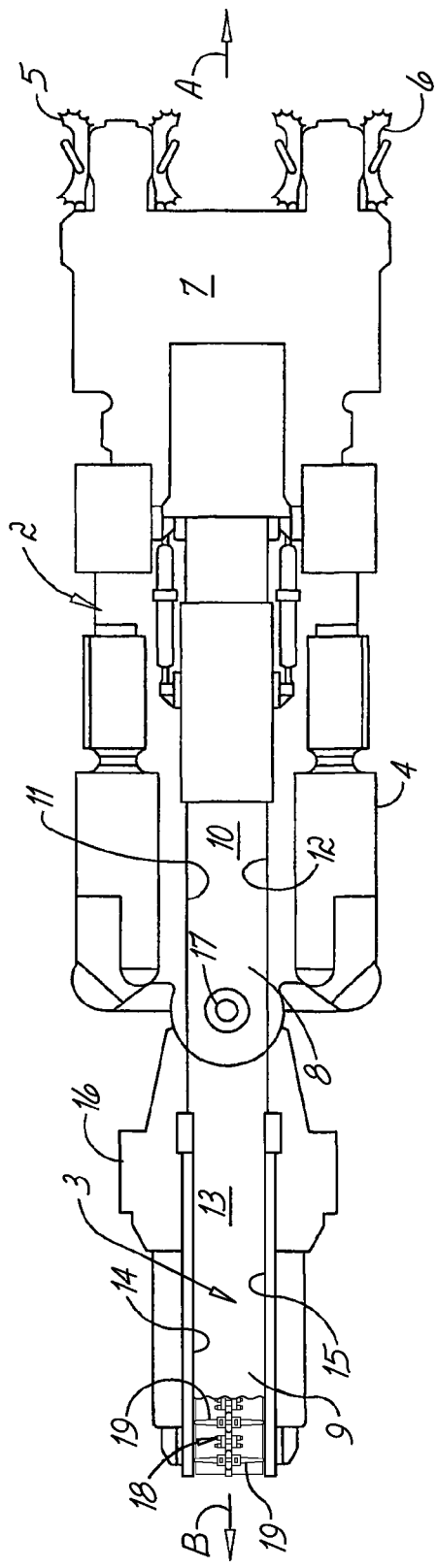
FIG. 1 is a plan view of a typical continuous mining machine having a tail conveyor for initializing the chain of the invention.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain examples of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

For better understanding of the invention, reference is first made to FIG. 1, illustrating an exemplary environment for the chains of the present invention. FIG. 1 diagrammatically illustrates a typical continuous mining machine generally indicated at 2 and provided with a tail conveyor, generally indicated at 3. The mining machine has a body portion 4 which is usually mounted on wheels or treads and is self-propelled. At the forward end of the mining machine, cutting elements are provided as shown at 5 and 6. These cutting elements 5 and 6 may take various well known forms and are suitably mounted such as on the frame 7, enabling the cutting means to be shifted in such a way that they will cut an entry large enough to receive and to permit advancement of the mining machine 2 in the cutting direction indicated by arrow A.

By various well known conveying means, the cut material at the forward end of the mining machine is gathered and transported over or through the mining machine to the tail conveyor 3. This last mentioned conveyor comprises a conveyor base element, illustrated in FIG. 1 as made up of two sections 8 and 9. The base element section 8 has a bottom portion 10 and upstanding side guide or flanges 11 and 12. Similarly, the section 9 has a bottom portion 13 and upstanding side guides or flanges 14 and 15. The section 9 is mounted on a boom 16 articulated to the rearward end of the mining machine body 4 as at point 17. The articulation is such that the boom 16 and its conveyor base element section 9 are shiftable with respect to the conveyor base element section 8 both in the vertical plane and the horizontal plane. A pusher-type conveyor chain, generally indicated at 18, extends along the length of the conveyor base element sections 8 and 9 and is adapted to be driven along the upper surface of their bottom portions 10 and 13. It will be understood that the chain 18 is a continuous chain. Normally it will be driven by a sprocket positioned at least at one end of the tail conveyor 3.

As shown in FIG. 1, a typical chain 18 is provided with a plurality of spaced pusher elements arms 19, extending substantially transversely of the conveying direction indicated by arrow B. It will be seen that the pusher elements preferably extend to both side if the chain 18 and that the pusher elements are located at predetermined intervals along the length of the chain.

Figure 2:
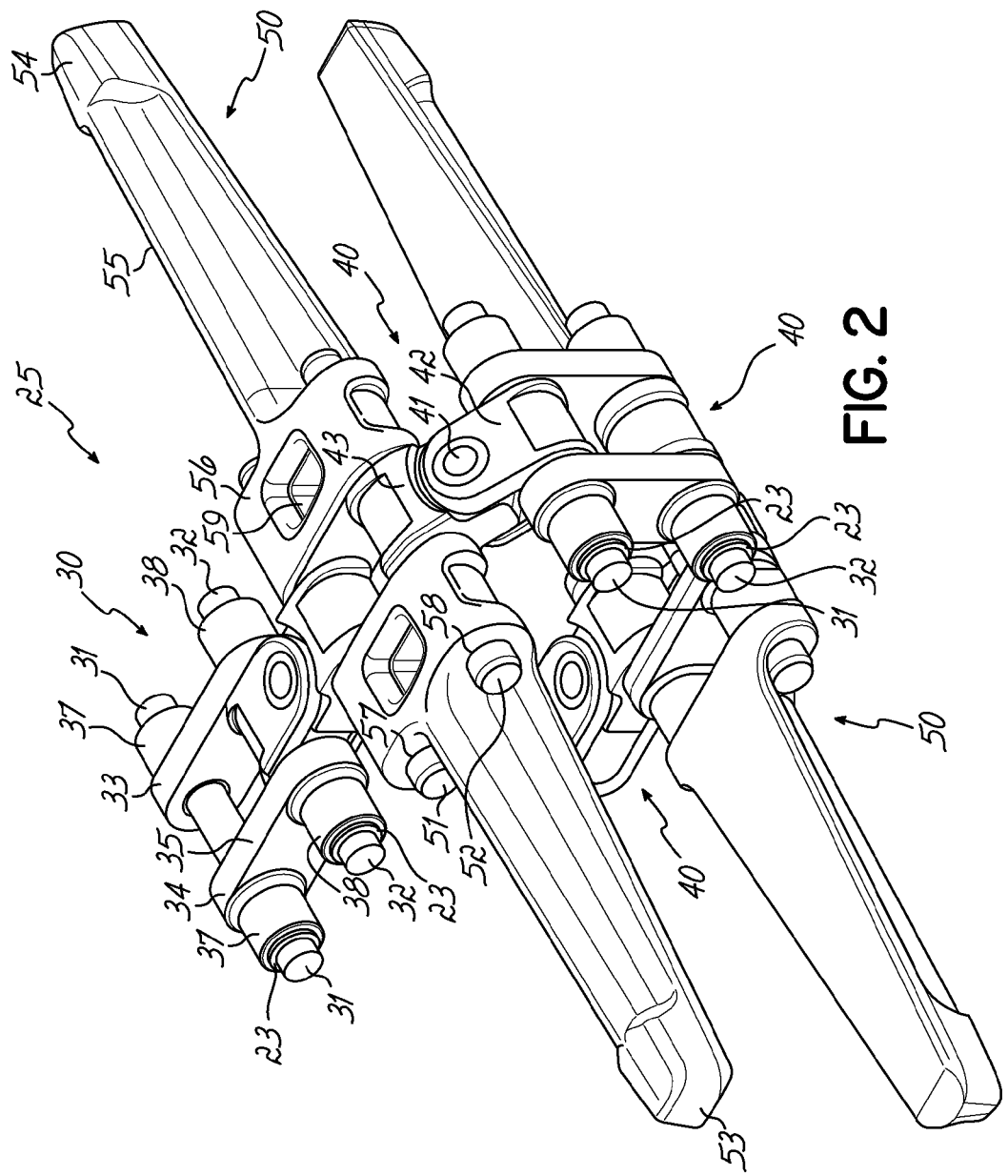
FIG. 2 depicts a perspective view of a segment of an exemplary conveyor chain in accordance with an embodiment of the invention.
Figure 3:
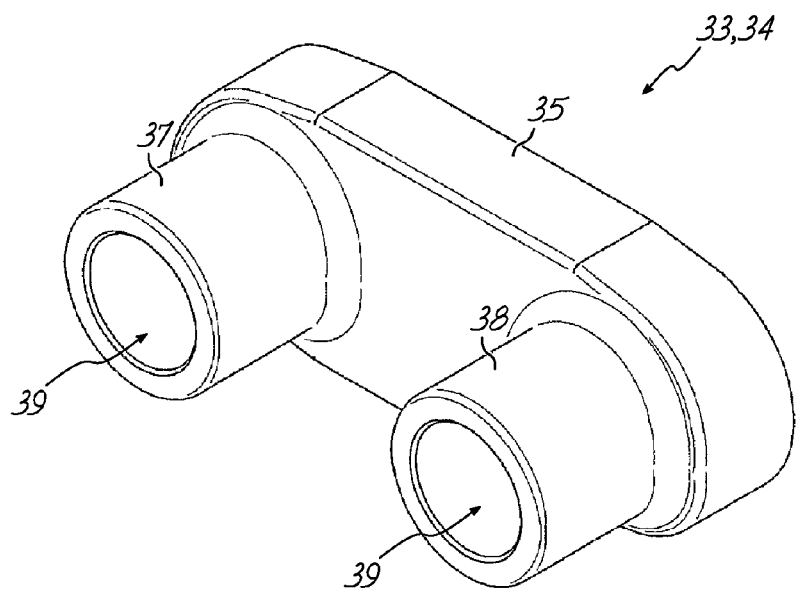
FIG. 3 depicts a perspective view of an exemplary side strap of an embodiment of the invention.
Figure 5:
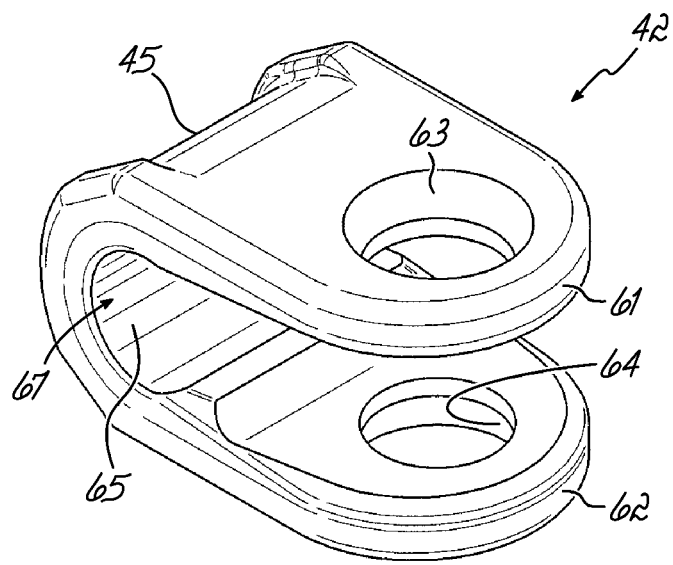
FIG. 5 depicts a perspective view of an exemplary universal link of an embodiment of the invention.
Figure 6:
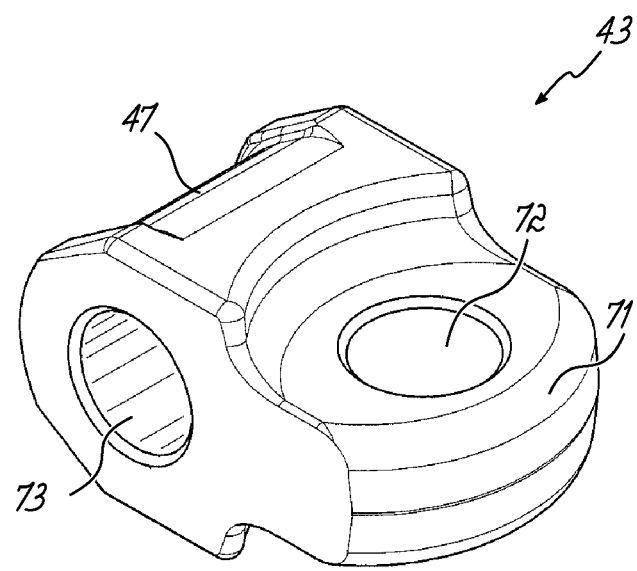
FIG. 6 depicts a perspective view of an exemplary connector link of an embodiment of the invention.
Figure 5A:
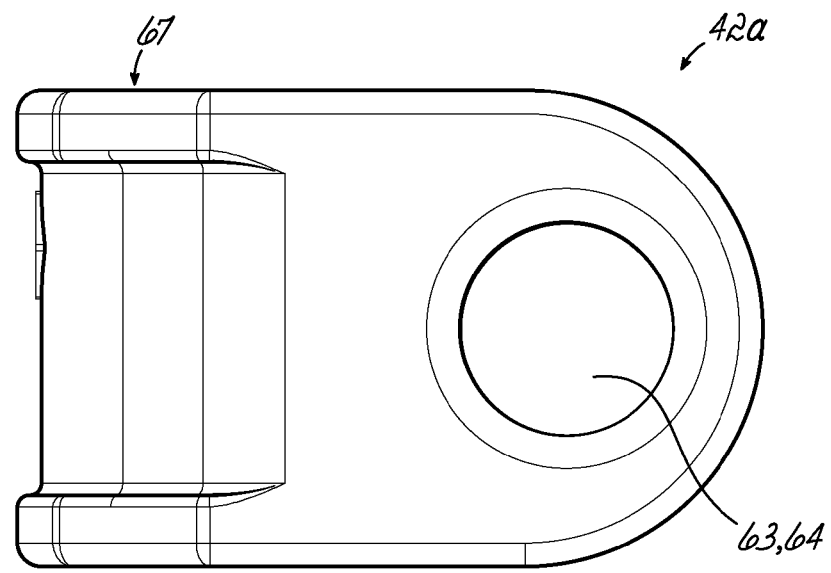
FIG. 5A is a top view of an exemplary universal link of an embodiment of the invention.
Figure 5B:
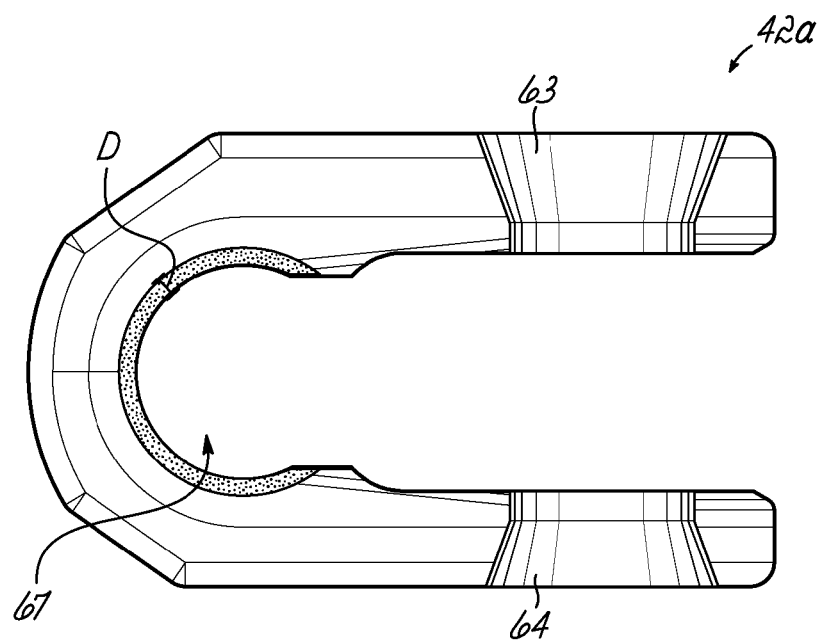
FIG. 5B is a side view of the exemplary universal link of FIG. 5A.

FIG. 2 illustrates a section of a conveyor chain 25 for use in a device such as that illustrated in FIG. 1. The chain section illustrated in FIG. 2 comprises two side link assemblies 35, four connector assemblies 40, and two flight arm assemblies 50. Of course, conveyor chain 25 will comprise any suitable number of side link assemblies, connector assemblies, and flight assemblies to produce a chain of sufficient length for a particular application. It will be appreciated that there is some appropriate duplication in the link assemblies. For example, side strap 33 may be virtually identical to side strap 34 in the side link assembly. In the illustrated embodiment, each universal connector assembly 40 comprises a universal link 42 FIG. 5 and a connector link 43 FIG. 6 with a universal pin 41 FIG. 7 extending through the universal link 42 and the connector link 43. As shown in FIG. 2, each flight arm assembly 50 comprises a pair of flight arm pins 51, 52 and a pair of flight arms 53, 54.

In the illustrated embodiment, the two side straps 33, 34 of each side link assembly 30 are spaced apart and positioned so that the two side strap bosses 37, 38 are facing outwardly with respect to a center line of the chain. In this example, each side strap boss 37, 38 comprises a hollow circular protrusion that includes an opening 39 that extends through the side strap boss 37, 38 and through base 35. Each side strap boss 37, 38 is configured to receive at least a portion of a connecting pin 31, 32. The connecting pins span between the side straps and connect the opposing side straps. Of course, side strap bosses 37, 38 may comprise any suitable shape, including but not limited to circular and square.

Figure 13:
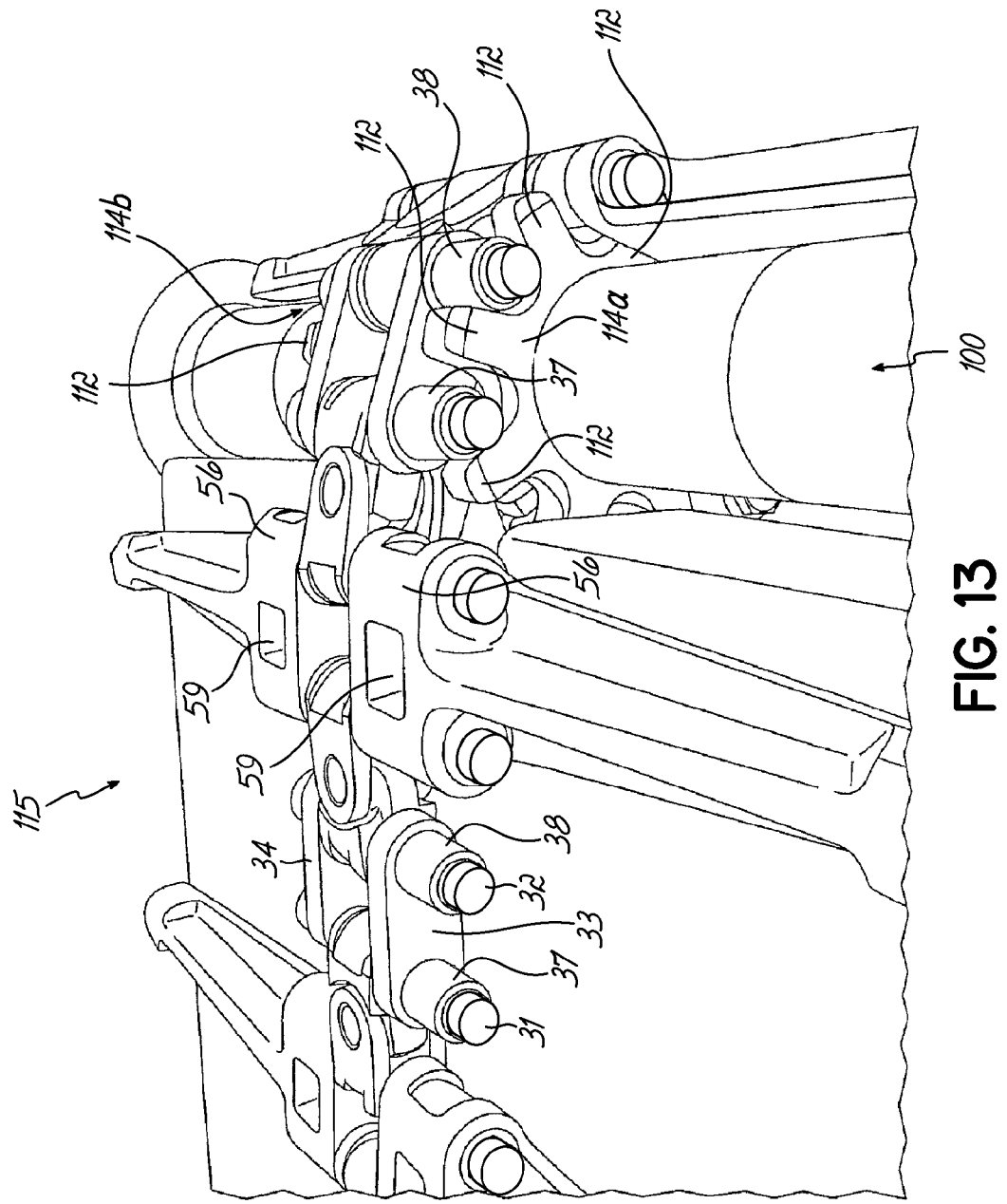
FIG. 13 depicts a perspective view of a section of exemplary conveyor chain engaged with an exemplary driving member comprising a dual drive sprocket of an embodiment of the invention.
Figure 14:
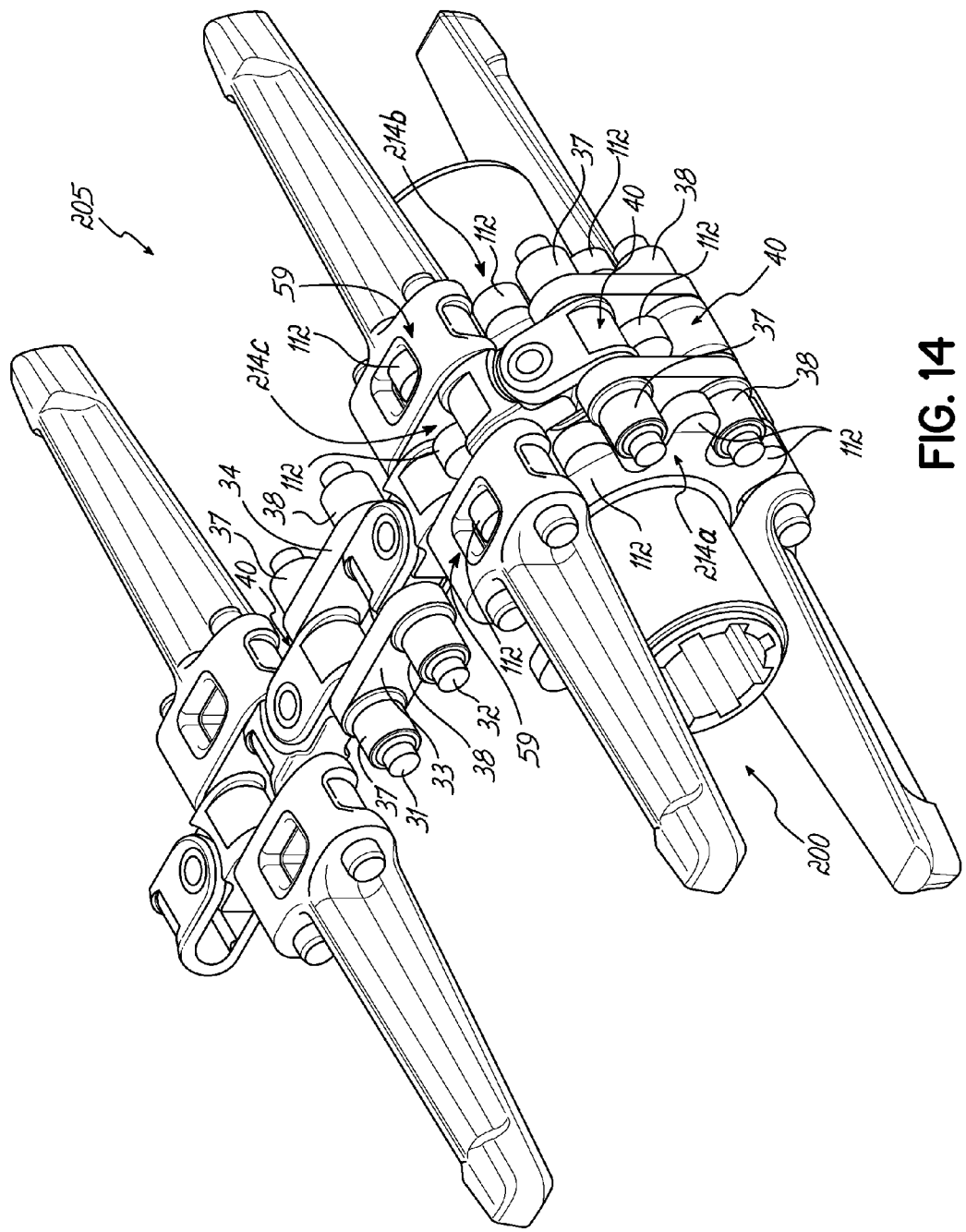
FIG. 14 depicts a perspective view of a section of exemplary conveyor chain engaged with an exemplary driving member comprising a triple drive sprocket of an embodiment of the invention.

As shown in FIGS. 13 and 14, when the chain is driven, the side strap bosses 37, 38 are configured to engage a tooth 112 of a sprocket, such as one of sprockets 114a, 114b of drive mechanism 100 or outer sprockets 214a, 214b of drive mechanism 200. The chain is engaged and driven by a suitable driving member, such as a dual drive sprocket 100 FIG. 13, a triple drive sprocket 200 FIG. 14 or any other suitable driving member. The chain of the present invention is configured to be able to handle both a dual drive sprocket arrangement, as illustrated in FIG. 13, or a triple drive sprocket arrangement as in FIG. 14 depending on its use. In the illustrated embodiments, the side strap 33 in each side link assembly 30 is aligned with side strap 34 such that each side strap boss 37, 38 of side strap 33 is aligned with a corresponding side strap boss 37, 38 of side strap 34. In the embodiments, a first connecting pin 31 is inserted through the aligned side strap bosses 37 in side straps 33, 34, while a second connecting pin 32 is inserted through the aligned side strap bosses 38 in side straps 33, 34. Collectively, the side straps 33, 34 and connecting pins 31, 32 form a side link assembly 30.

Figure 4:
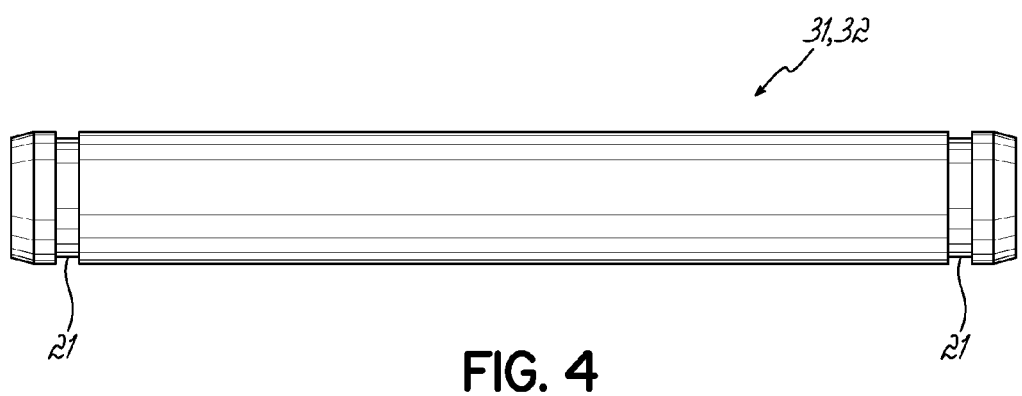
FIG. 4 depicts a perspective view of an exemplary connecting pin of an embodiment of the invention.

The diameter of the connecting pins 31, 32 may be about 1⅛ inch, or any other suitable dimension. By way of example only, in some embodiments the diameter of the connecting pin 31, 32 may range from about 1 inch to about 1¼ inch. Increasing the diameter of the connecting pins 31, 32 compared to bearing pins used in existing conveyor chains will improve the strength and reliability of the conveyor chain during operation while reducing the chance of chain breakage. The connecting pins 31, 32 and side strap bosses 37, 38 may be configured to provide a press fit, a sliding close tolerance fit, or any other suitable fit between the components to form the complete side link assembly. Connecting pins 31, 32 may be retained within side strap bosses 37, 38 by keeper pins, retaining rings, by press fit alone, or by any other suitable method or device. In one embodiment a ring is press fit onto the end of the connecting pin to engage groove 21 and hold the pins in the side straps 33, 34 of the side link assemblies (see FIG. 4).

Figure 15A:
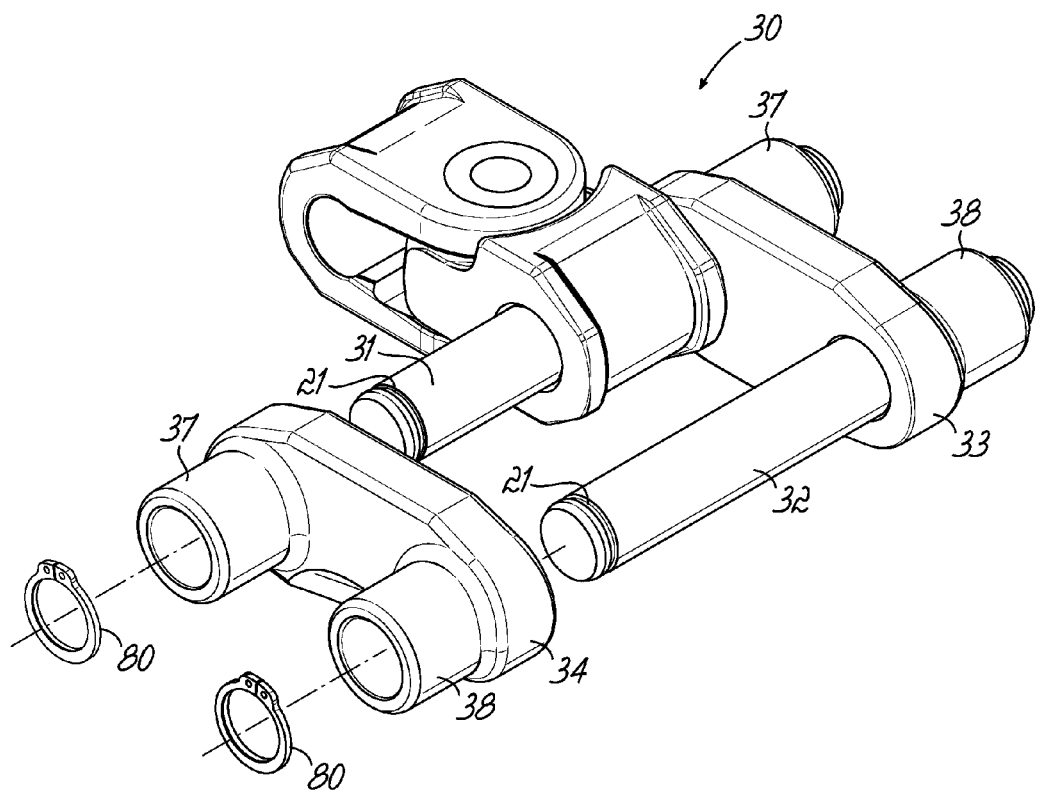
FIG. 15A is an exploded perspective view of an exemplary side link assembly of an embodiment of the invention.
Figure 15B:
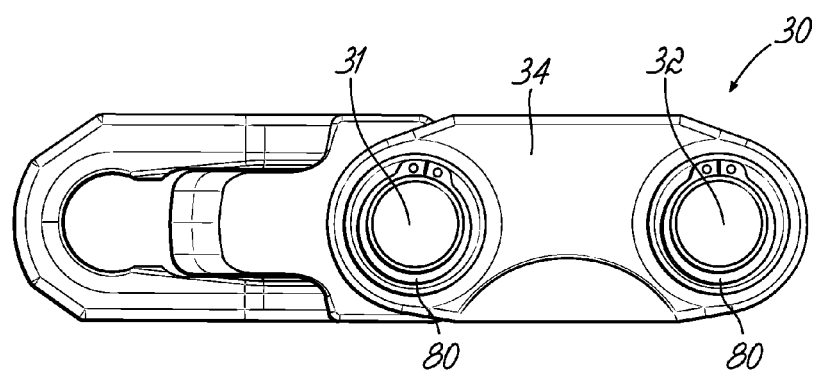
FIG. 15B is a side view of the exemplary side link assembly of FIG. 15A.
Figure 16:
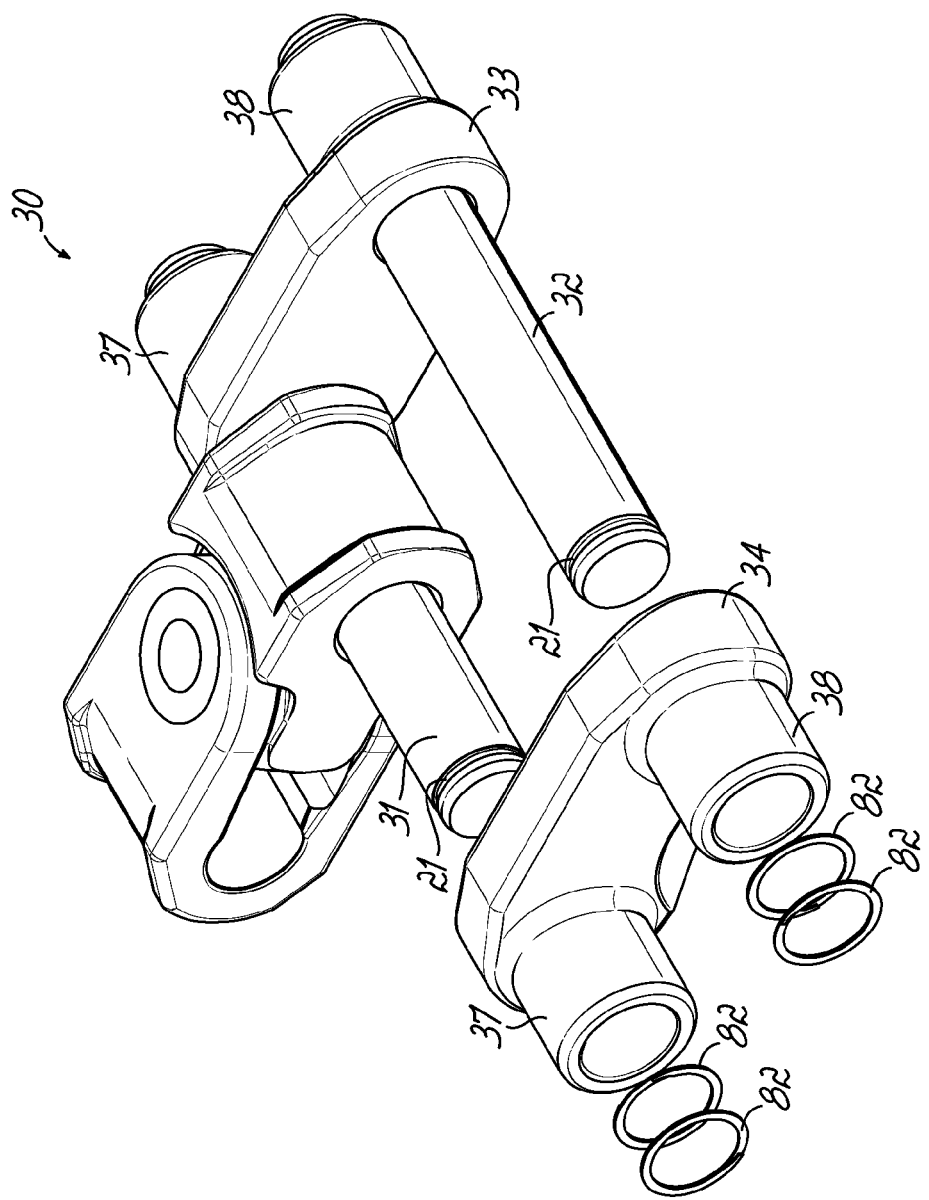
FIG. 16 is an exploded perspective view of an exemplary side link assembly of an embodiment of the invention.

While the embodiment of the invention is illustrated in FIG. 2 shows connecting pins 31, 32 that are retained within the side strap bosses 47, 48 by a press fit ring and a ring 23, FIGS. 15A, 15B and 16 illustrate alternative embodiments to the invention wherein alternative securing elements are utilized with the connecting pins, 31, 32 for forming the side link assembly 30. Specifically, as illustrated in FIG. 15A, the connecting pins 31, 32 are inserted into the corresponding and aligning side strap bosses 37, 38 of the opposing side straps 33, 34. The connecting pins 31, 32 include connector grooves 21 formed therein at each end. When the connecting pins 31, 32 extend through the side strap bosses 37, 38, the corresponding grooves 21 at either end of the connecting pins are exposed adjacent the end of the respective bosses 37, 38. Retaining rings 80 in the form of external retaining are expandable rings that may be expanded or spread apart, are appropriately positioned around an end of the connecting pins 31, 32 and are then dimensioned in an unexpanded state to engage the grooves 21 and fit snuggly against the ends of the bosses 37, 38 to secure the connecting pins in the side straps 33, 34. The retaining rings 80 are illustrated in FIGS. 15A and 15B on one side of the assembly 30, but it will be readily understood that the retaining rings are implemented on both ends of the connecting pins 31, 32 for holding the pins in each of the side straps 33, 34. The external retaining rings or snap rings 80 may be formed with a suitably strong material such as stainless steel and may have an inner diameter around 1 1/16 inches. FIG. 15B illustrates a side view of side link assembly 30 with rings 80 in place with the connecting pins 31, 32.

Turning now to FIG. 16, that figure illustrates a side link assembly 30 and incorporates other retaining elements. Specifically, one or more spiral retaining rings 82 are utilized to fit into the grooves 21 of connecting pins 31, 32. The spiral retaining ring may be single turn or multi-turn spiral retaining rings. As illustrated in FIG. 16, multiple spiral rings might be utilized to hold the connecting pins 31, 32. Alternatively, only a single spiral retaining ring might be utilized in the embodiment as shown in FIG. 16. The external retaining rings 80 and spiral retaining rings 82 provide for an easier disassembly of the side link assembly such as for replacement or repair. The rings, 80, 82 may be removed and re-installed numerous times without destroying the rings or weakening their engagement with the pins.

Figure 7:
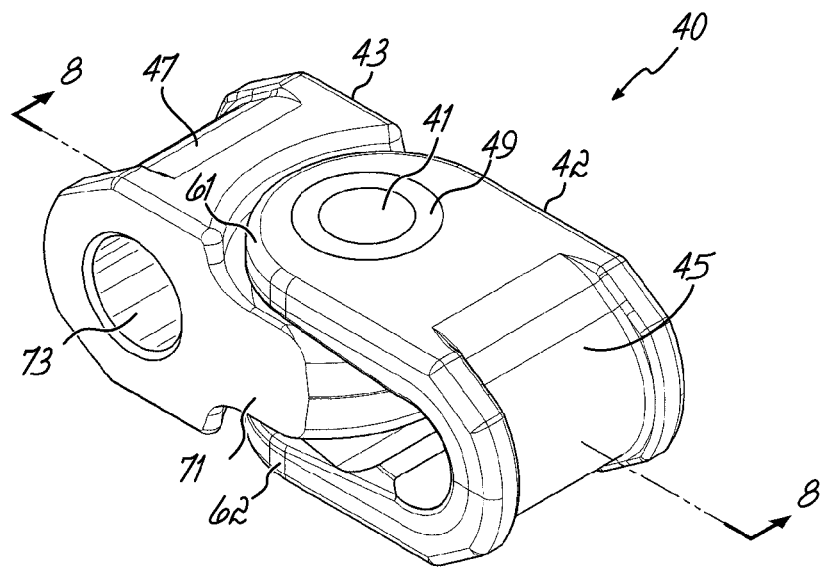
FIG. 7 depicts a perspective view of an exemplary universal connector assembly of an embodiment of the invention.

FIGS. 5-8 depict one embodiment of a universal connector assembly 40. In the illustrated embodiment, universal connector assembly 40 comprises a universal pin 41, a universal link 42, and a connector link 43. The universal link 42 as pictured in FIG. 5, comprises an upper lip 61 and lower lip 62 each having a vertical thru-hole 63, 64 that is configured to receive at least a portion of the universal pin 41. The universal link 42 can also be described as the female link. In this example, universal link 42 further comprises connecting portion 65 that extends between upper lip 61 and lower lip 62. As shown, connecting portion 65 is rounded and has an inside surface that forms a horizontal bore/thru-hole 67 configured to receive at least a portion of a connecting pin 31, 32 of a side link assembly or a flight pin 51, 52 of a flight arm assembly. The universal link 42 also includes a groove 45 formed on the outside surface of the connecting portion 65. The groove 45 of universal connector assembly 40 provides a surface for engagement by a center or third sprocket for driving the chain discussed herein. In the illustrated embodiment, connector link 43 comprises a projecting member 71 sized and shaped to fit between the upper lip 61 and lower lip 62 of the universal link 42 as shown in FIG. 7. The connector link 43 can also be described as a male link. In this version, projecting member 71 includes a vertical bore or thru-hole 72 that is configured to receive a universal pin 41. In this example, connector link 43 further comprises a horizontal bore or opening 73 that extends through the width of connector link 43 and is configured to receive at least a portion of a connecting pin 31, 32 or a flight pin 51, 52. The connector link 43 also includes a groove 47 formed on an end of the connector link opposite the projecting member. Groove 47 also provides a surface for engagement by a center/third sprocket for driving the chain if desired.

Figure 8:
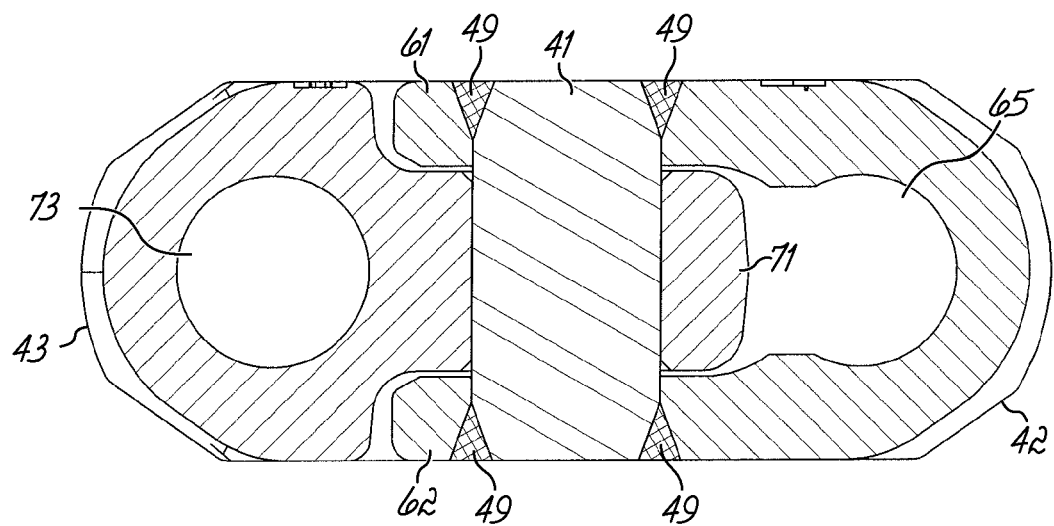
FIG. 8 depicts a side cross-sectional view of the exemplary universal connector assembly of FIG. 7 of an embodiment of the invention.
Figure 12:
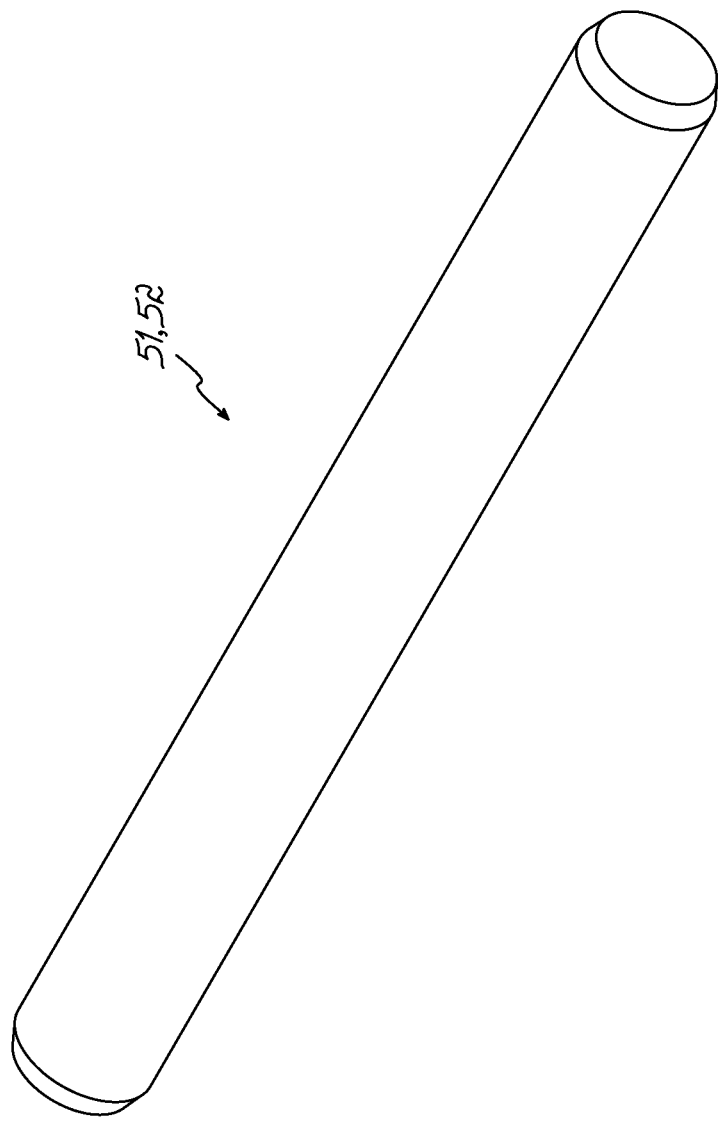
FIG. 12 depicts a perspective view of an exemplary flight pin of an embodiment of the invention.

As shown in FIGS. 7 and 8, when universal connector assembly 40 is fully assembled, the projecting member 71 of the connector link 43 is inserted between the upper lip 61 and lower lip 62 of the universal link 42. In this example, vertical thru-holes 63, 64 of the universal link 42 are axially aligned with vertical thru-hole 72 of the connector link, such that the universal pin 41 may pass through the vertical thru-holes 64, 63, 72 as shown in FIGS. 7 and 8. The universal pin 41 may be configured to increase mobility of the chain, allow the chain to articulate past objects, and reduce the load transmitted to the connecting pins 31, 32 when an obstruction in a conveying deck is encountered.

FIGS. 5A-5B and 6A-6B illustrate alternative universal links and connector links respectively in accordance with another embodiment of the invention. Specifically, the universal link 42a and connector link 43a include thru-holes or bores that are induction hardened to have a greater hardness than the remaining portions of the respective links. For example, referring to FIGS. 5A and 5B, the horizontal bore or thru-hole 67 is hardened at a specific depth around the bore to a greater hardness rating than the rest of the link. For example, while the universal link 42a, after machining, might have a hardness of around 40-44 on the Rockwell C Scale (40-44 Rc) the thru-hole bore 67 might be induction hardened to have a hardness rating of around 50-54 Rc. In accordance with one embodiment of the invention, such hardness may be induced to a depth D of ⅛ inch to 3/16 inches deep around the thru-hole and completely through that hole 67.

Figure 6A:
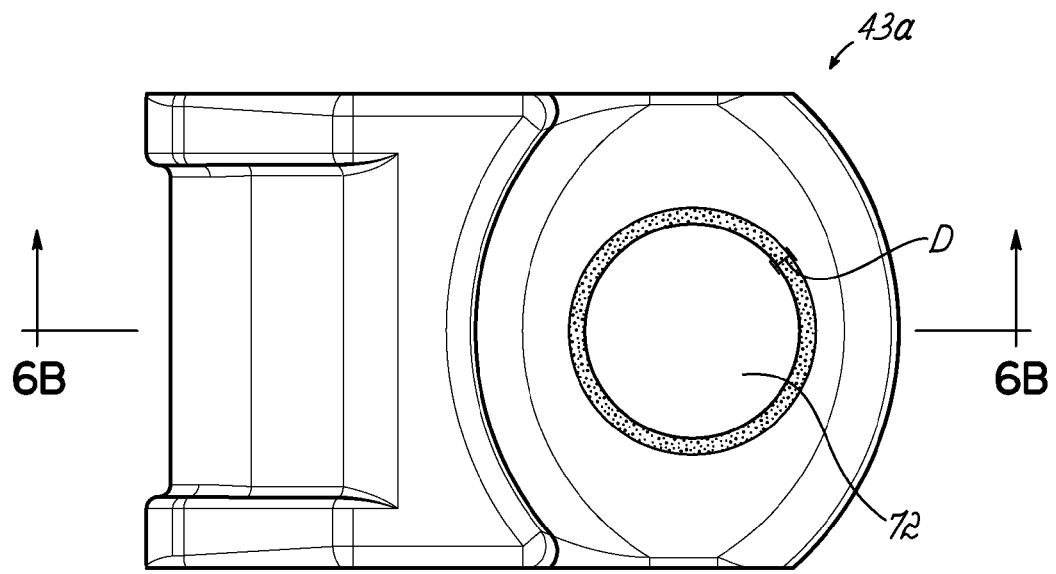
FIG. 6A is a top view of an exemplary connector link of an embodiment of the invention.
Figure 6B:
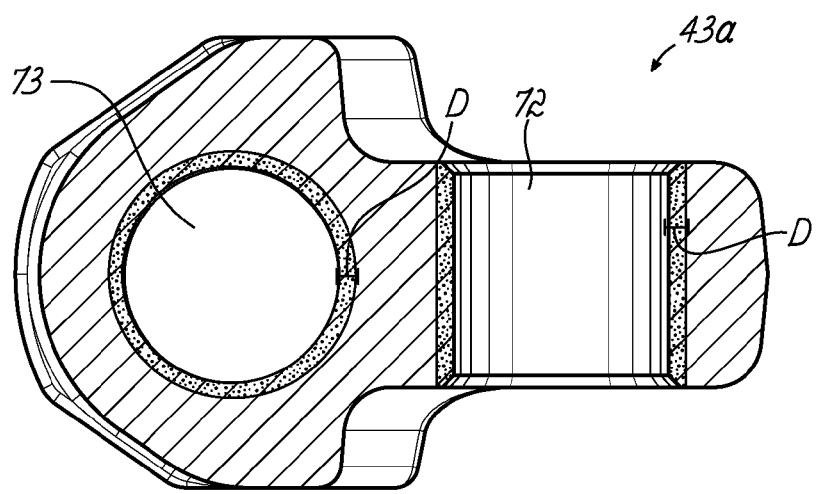
FIG. 6B is a side view of the exemplary connector link of FIG. 6A.

Connector link 43a as shown in FIGS. 6A-6B might also be hardened in accordance with an embodiment of the invention. To that end, vertical bore or thru-hole 72 and horizontal bore or opening 73 might also be hardened to a hardness of 50-54 Rc around the bore or hole to a depth D of ⅛ inch to 3/16 inches.

In accordance with an aspect of the invention, the localized bore or thru-hole hardening in the links, 42a, 43a of a universal connector assembly with respect to the overall link elements will reduce the wear in those various high bore and wear areas where the pins 41 and 31, 32, 51, 52 engage and thus extend the overall life of the chain. Generally, a universal pin 41, as illustrated in FIG. 7, is held in place in holes 63, 64, such as by a weld 49. Therefore the hardening of hole 72 provides desirable wear resistance. Similarly, as the hole 67 and opening 73 rotate around connecting pins 31, 32 or flight pins 51, 52, the hardening of those holes and openings provide additional wear resistance to extend the overall life of the chain.

When the various elements of the universal connector assembly are hardened, they are induction hardened by positioning a coil in the various holes or bores introducing significant heat, such as around 1600° Fahrenheit to that coil. The temperature and length of time of the induction hardening may be adjusted accordingly in order to achieve the desired depth of induction hardening of the noted bores and thru-holes.

As shown in FIG. 2, flight arm assembly 50 comprises a pair of flight pins 51, 52 and a pair of flight arms 53, 54 positioned on either side of the chain. In the example of FIGS. 9-11, each flight arm 53, 54 comprises an elongated body 55 extending substantially perpendicular from an integral base 56. In this embodiment, each base 56 includes a pair of flight arm attachment apertures 57, 58 or pockets that extend transversely through the base 56. Each flight arm attachment aperture 57, 58 may be configured to receive at least a portion of one of the flight pins 51, 52. As shown, each base 56 further comprises a vertical sprocket opening 59 that is formed through the base and extends vertically through the base 56. The diameter of the flight pin may be about 1⅛ inch, or any other suitable dimension. By way of example only, in some embodiments the diameter of the flight pin 51, 52 may range from about 1 inch to about 1¼ inch. Increasing the diameter of the flight pins 51, 52 compared to bearing pins used in existing conveyor chains will improve the strength and reliability of the conveyor chain during operation while reducing the chance of chain breakage. The flight pins 51, 52 and bases 56 may be configured to provide a press fit, a sliding close tolerance fit, or any other suitable fit between the components. Flight pins 51, 52 may be retained within the flight arm attachment apertures 57, 58 of bases 56 by keeper pins, welding by press fit, by press fit and weld, or by any other suitable method or device.

As shown in FIGS. 9-11, flight arm 53, 54 comprises an elongated body 55 having a flat, planar bottom surface 111 and an integral base 56. In this version, elongated body 55 comprises a central rib 101 that may act as a pusher for the material being conveyed. In this example, the outer free end of flight arm 53, 54 is provided with a knob-like portion 102 which can ride against side guide elements associated with the conveyors. The base 56 may be provided with a vertical sprocket opening 59. As shown in FIGS. 13 and 14, sprocket opening 59 is sized and shaped to engage a tooth 112 of a drive sprocket such as one of sprockets 114a, 114b of driving member 100 or sprockets 214a, 214b of driving member 200 when the chain is engaged and driven by a suitable driving member, such as a dual drive sprocket 100, a triple drive sprocket 200 or any other suitable driving member. While sprocket opening 59 is substantially rectangular in the illustrated embodiment, it will be appreciated that sprocket opening 59 may comprise any suitable shape configured to receive and engage a tooth 112, including but not limited to circular, oval, square, and rectangular. The base 56 also has a groove 61 formed in the base 56 along a bottom of the base for proper engagement and clearance of any sprocket teeth 102. In the illustrated version, base 56 also comprises the two flight arm attachment aperture 57, 58. As shown in FIG. 2, flight arm 53 in each flight arm assembly 50 is aligned with flight arm 54 on the other side of the chain such that the flight arm attachment apertures 57, 58 of flight arm 53 are aligned with the flight arm attachment apertures 57, 58 of flight arm 54. In this example, a first flight pin 51 is inserted through the aligned flight arm attachment apertures 57 in flight arms 53, 54, while a second flight pin 52 is inserted through the aligned flight arm attachment apertures 58 in the flight arms 53, 54. In addition, each of the flight pins 51, 52 are inserted through appropriate horizontal openings 73 of a pair of connector links 43 or holes 67 a pair of universal links positioned between the flight arms 53, 54.

As shown in FIG. 2, section of conveyor chain 25 comprises a plurality of alternating side link assemblies 30 and flight arm assemblies 50 connected by connector assemblies 40. In this version, each universal connector assembly 40 is configured and arranged to be connected to both a side link assembly 30 and a flight arm assembly 50. In this example, conveyor chain 25 comprises a side link assembly 30 connected to a first universal connector assembly 40, a flight arm assembly 50 connected to both the first universal connector assembly 40 and a second universal connector assembly 40, and the second universal connector assembly 40 is connected to a second side link assembly 30 and so on in a repeating pattern. While the illustrated version depicts a chain comprising alternating side strap assemblies 30 and flight arm assemblies 50, it will be appreciated that a section of chain may comprise any suitable arrangement of side strap assemblies 30 and flight arm assemblies 50. By way of example only, in an alternate embodiment (not shown), a section of conveyor chain may comprise two side strap assemblies positioned between a pair of flight arm assemblies. As shown in FIG. 2, a side link assembly 30 is connected to a universal connector assembly 40 via a connecting pin 32. In this version, connecting pin 32 is positioned such that it passes through the aligned side strap bosses 38 of side straps 33, 34 and the opening 67 formed by connecting member 65 of universal link 42. (Alternatively, a side link assembly 30 may be connected to a universal connector assembly 40 via a connecting pin 31 such that connecting pin 31 is positioned so that it passes through the aligned side strap bosses 37 of side straps 33, 34 and the horizontal opening 73 in connector link 43.) Similarly, flight assembly 50 may be connected to a universal connector assembly 40 by positioning a flight pin 51, 52 through a pair of aligned flight arm attachment apertures 57, 58 in two opposing flight arms 53, 54 and the horizontal opening 73 in connector link 43. (Alternatively, a flight assembly 50 may be connected to a universal connector assembly 40 by positioning a flight pin 51, 52 through a pair of aligned flight arm attachment apertures 57, 58 in two opposing flight arms 53, 54 and the opening 67 formed by connecting member 65 in a universal link 42.)

Figure 17:
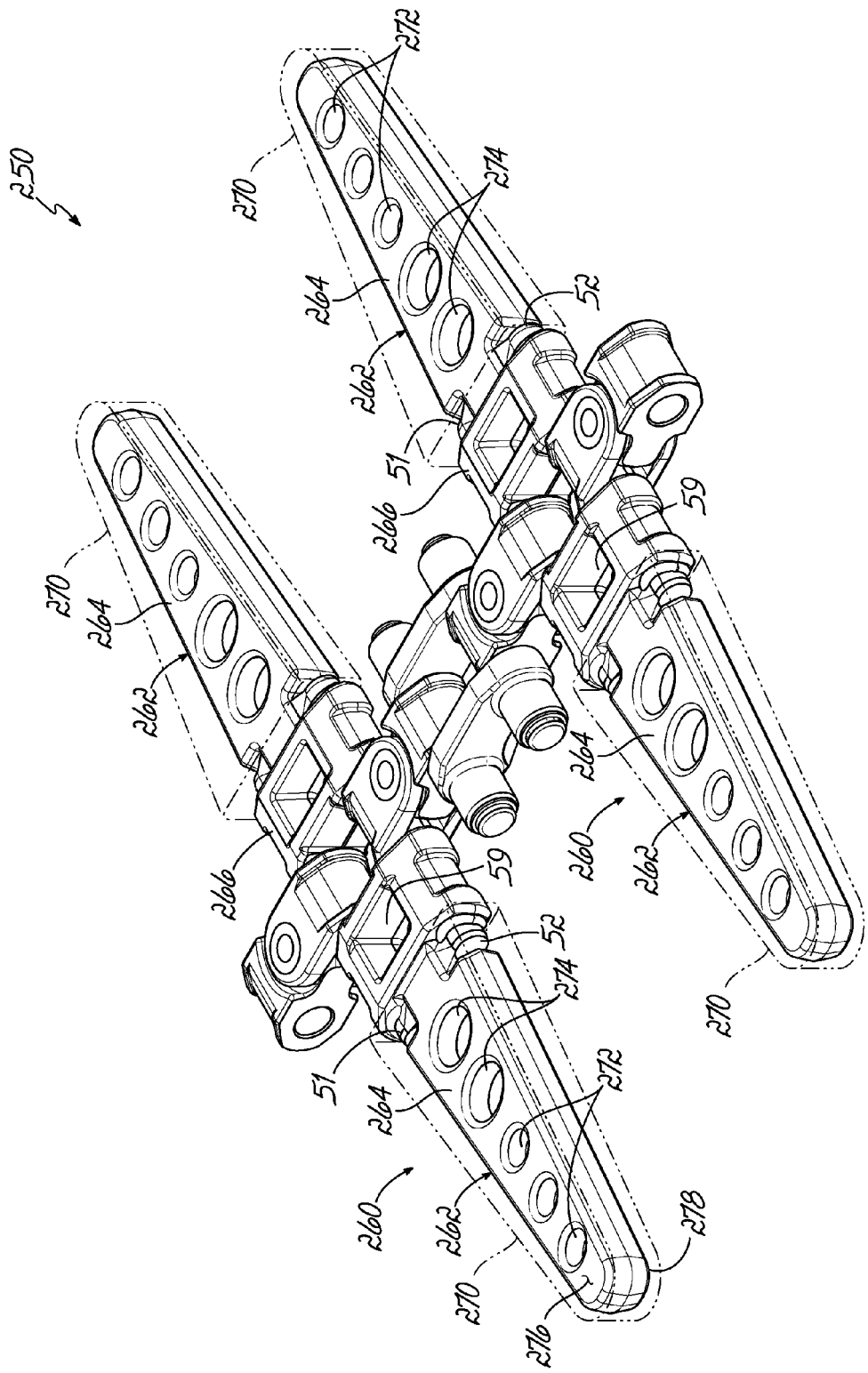
FIG. 17 is a perspective view of a segment of an exemplary conveyor chain in accordance with an embodiment of the invention.

FIG. 17 illustrates another embodiment of the invention. Chain 250 is similar to the chains described herein in many details but also incorporates flight assemblies having an alternative construction. Specifically, chain 250 incorporates flight arm assemblies 260 that incorporate flight arms that are covered in a suitable urethane material 270. The urethane material, in accordance with one aspect of the invention, provides for a reduction in the noise generated when the chain 250 is in operation. While chain 250, incorporates different flight arm assemblies 260, other components of the chain, such as the side link assemblies and universal connector assemblies may be constructed as noted herein. Each of the flight arm assemblies 260 includes a pair of flight pins 51, 52 as discussed above. Each of the flight arms 262 also includes an elongated body 264 which extends substantially perpendicular from an integral base 266. Base 266 may resemble base 56 illustrated in other figures and discussed herein. That is, the base includes a pair of flight arm attachment apertures 57, 58 that extend transversely through the base. Each base also includes a vertical sprocket opening 59 that is formed through the base and extends vertically therethrough, such as to receive the teeth of drive sprockets.

Each flight assembly 260 includes a layer of urethane material 270 that is formed or appropriately applied to the elongated body 262 of the flight arms. The elongated body 262 incorporates a series of apertures that are formed in the body 262. The embodiment illustrated in FIG. 17 shows 5 apertures, including apertures 272 having a circular diameter of 1.25 inches and two larger apertures 274 having a circular diameter of approximately 2 inches. The apertures are formed through each of the flight arms from top to bottom and provide passages for the flow of urethane material therethrough to form an integral attachment of the urethane material layer 270 to the flight arm bodies 262. For example, the urethane material may be flowed or formed over the flight arm bodies 262 in a liquid or semi liquid form which flows or extends through the apertures 272, 274. The urethane material then hardens and secures the material layer 270 to the flight arm 262 to become an integral part of the flight assembly 260. The urethane material layer is illustrated over most or all of the elongated body of the flight arm, but urethane material might be used over at least a portion of the elongated body. It would be understood by person of ordinary skill in the art that apertures having a shape or cross section that is different than a circular cross section may be implemented. Furthermore, a greater or lesser number of apertures may be utilized along the length of the flight arm bodies 262. Still further, different sizes of apertures may be implemented along the length of the flight arm bodies 262, therefore the invention is not limited to the number, size or shape of the apertures formed in the flight arm as illustrated in the example of the Figures. Each flight arm body 262 has a generally flat upper surface 276 and lower surface 278. Similarly, the urethane material layer 270 in the embodiment illustrated in FIG. 17, is shown to have a similar flat upper, lower surface conforming with the surfaces 276, 278 of the flight arm bodies 262. In that way, the flight arm slides freely along a conveyor surface. Also, although the urethane material layer 270 illustrated in FIG. 17 is shown to be somewhat clear, thus revealing the elongated the flight arm bodies 262, urethane material 270 might also be opaque in order to hide the internal flight arm body 262.

In another alternative embodiment of the invention, elements of the chain are covered with a corrosion protective coating. For example, the elements might be galvanized, or maybe covered with a nickel coating. In one embodiment, various connecting pins 31, 32 and flight pins 51, 52 as well as the universal pin 41, universal link 42 and connector link 43 are all coated as appropriate for protection against corrosion. Additionally, the elements of the side link assembly, including the base 35 and side strap bosses 37, 38 and any internal openings 39 may be coated with a suitable corrosion protective coating.

As shown in FIG. 13, conveyor chain 115 is driven by a driving member 100. In this example, driving member 100 comprises a dual drive sprocket that includes sprockets 114a, 114b. It will be appreciated that driving member 100 may comprise any suitable number of sprockets, including but not limited to a dual drive sprocket as shown in FIG. 13, a triple drive sprocket as shown in FIG. 14, or any other suitable number of sprockets. It will further be appreciated that driving member may comprise any suitable size sprockets, including but not limited to a four tooth sprocket, five tooth sprocket, a six-tooth sprocket, an eight tooth sprocket, and various combinations thereof. Use of a dual drive sprocket, such as driving member 100 shown in FIG. 13, and a corresponding conveyor chain configured to be used with a dual drive sprocket, such as conveyor chains 25, 115, 205, may reduce operational noise and improve sprocket tooth life. The two sprockets 114a, 114b comprising driving member 100 may be substantially identical to each other and configured to rotate in unison with each other. By way of example only, in the embodiments shown in FIG. 13, sprockets 114a, 114b are each eight-tooth sprockets.

As shown, sprockets 114a, 114b are spaced apart so that they are aligned with the side strap bosses 37, 38 and the vertical sprocket openings 59 along each side of the chain 115. In the illustrated embodiment, as conveyor chain 115 wraps around driving member 100, each sprocket tooth 112 engages a side strap boss 37, 38 or the base 56 of a flight arm 53, 54 via a vertical sprocket opening 59 along both sides of the chain 115. As shown, a first sprocket tooth 112 may abut a first side strap boss 37, while a second sprocket tooth 112 may abut a second side strap boss 38, while a third sprocket tooth 112 may be received by and extend at least partially through a vertical sprocket opening 59. Although not shown in FIG. 13, additional sprocket teeth may engage additional side strap bosses and vertical sprocket openings as the chain wraps around the dual sprocket. In the illustrated embodiment, the sprocket teeth 112 do not directly engage or contact connecting pins 31, 32) or flight pins 51, 52. Because the points of engagement between conveyor chain 115 and sprocket teeth 112 (i.e. side strap bosses 37, 38 and flight arm bases 56) are thicker than the points of engagement in some prior art conveyor chains (where sprocket teeth directly engage bearing pins in the chain), conveyor chain 115 may provide improved chain life and strength.

As shown in FIG. 14, conveyor chain 205 is driven by a driving member 200. In this example, driving member 200 comprises a triple drive sprocket that includes two outer sprockets 214a, 214b and a central sprocket 214c. It will be appreciated that driving member 200 may comprise any suitable number of sprockets, including but not limited to a dual drive sprocket as shown in FIG. 13, a triple drive sprocket as shown in FIG. 14, or any other suitable number of sprockets. It will further be appreciated that the driving member may comprise any suitable size sprockets, including but not limited to a four tooth sprocket, five tooth sprocket, a six-tooth sprocket, an eight tooth sprocket, and various combinations thereof. Use of a triple drive sprocket, such as driving member 200 shown in FIG. 14, and a corresponding conveyor chain configured to be used with a triple drive sprocket, such as conveyor chains 25, 115, 205, may reduce operational noise and improve sprocket tooth life. The two outer sprockets 214a, 214b may be substantially identical to each other, while central sprocket 214c may be configured to have half as many sprocket teeth as outer sprockets 214a, 214b. Other suitable relationships between the outer sprockets and the central sprocket may be apparent to those of ordinary skill in the art. All three sprockets 214a, 214b, 214c may be configured to rotate in unison with each other. By way of example only, in the embodiment shown in FIG. 14, outer sprockets 214a, 214b are each eight-tooth sprockets and central sprocket 214c is a four-tooth sprocket.

As shown, outer sprockets 214a, 214b are spaced apart so that they are aligned with the side strap bosses 37, 38 and the vertical sprocket openings 59 along each side of the chain 205. Also, in this example, central sprocket 214c is positioned so that the teeth 112 of central sprocket 214c are received in the gap between adjacent universal connector assemblies 40 and engage a universal connector assembly 40. In the illustrated embodiment, as conveyor chain 205 wraps around driving member 200, each sprocket tooth 112 of the outer sprockets 214a, 214b engages a side strap boss 37, 38 or the base 56 of a flight arm 53, 54 via a vertical sprocket opening 59 along both sides of the chain 205. At the same time, each sprocket tooth 112 of central sprocket 214c engages a universal connector assembly 40 along the central longitudinal axis of the chain 205. The sprocket teeth of central sprocket 214c engage grooves 45, 47 formed in universal connector assembly 40. As shown, a first sprocket tooth 112 of an outer sprocket 214a, 214b may abut a first side strap boss 37, while a second sprocket tooth 112 of an outer sprocket 214a, 214b may abut a second side strap boss 38, while a third tooth 112 of an outer sprocket 214a, 214b may be received by and extend at least partially through a vertical sprocket opening 59. At the same time, a first sprocket tooth 112 of central sprocket 214c may be received by and extend at least partially through an opening between a first pair of adjacent universal connector assemblies 40, while a second sprocket tooth 112 of central sprocket 214c may be received by and extend at least partially through an opening between a second pair of adjacent universal connector assemblies 40. Although not shown in FIG. 14, additional sprocket teeth 112 on outer the outer sprockets 214a, 214b may engage additional side strap bosses and vertical sprocket openings and additional sprocket teeth 112 on central sprocket 214c may engage additional openings between additional pairs of adjacent universal connector assemblies 40 as the chain wraps around the driving member 200. In the illustrated embodiment, the sprocket teeth 112 do not directly engage or contact connecting pins 31, 32 or flight pins 51, 52. Because the points of engagement between conveyor chain 205 and sprocket teeth 112 (i.e. side strap bosses 37, 38, flight arm bases 56, and universal connector assemblies 40) are thicker than the points of engagement in some prior art conveyor chains (such as chains where sprocket teeth directly engage bearing pins in the chain), conveyor chain 205 may provide improved chain life and strength.

In an alternate embodiment (not shown), the driving member may comprise a single sprocket, such as central sprocket 214c described above. In such an embodiment, the single sprocket may be positioned and configured to engage the chain by having the teeth of the sprocket received between adjacent universal connector assemblies, similar to the central sprocket 214c described above.

A conveyor chain, such as conveyor chains 25, 105, may comprise an even pitch along substantially the entire length of the conveyor chain, although this is not required. The pitch may comprise the distance between adjacent connecting pins 31, 32 and flight pins 51, 52. In one embodiment, the pitch may comprise about 3½ inches, although any suitable pitch may be used depending on the particular application. By way of example only, the pitch may also range from about 1 inch to about 5 inches in length, or more particularly from about 2½ inches to about 4½ inches in length. A conveyor chain with an even pitch may provide for an increased number of sprocket teeth engaged with the chain and may allow for the use of a driving member that comprises two or more individual sprockets.

The present chain is described and illustrated herein provides a particularly robust and wear resistant chain that even pitched chain design provided by the flight assemblies and universal connector assemblies allows more sprocket engagement and thus provides better inset chain flow over a foot shaft with more teeth engaged to carry the chain load. Furthermore, the chain provides an improved and higher breaking strength. Because the dual sprockets drive in the flight arm attachment apertures and on the side strap bosses, the chain eliminates significant pin wear and failure caused from pin breakage. Also, the universal connector assemblies provide increased flight articulation in the movement of the chain.

It should be appreciated that the various components may be comprised of any suitable material known in the art that exhibits the requisite strength and durability characteristics based on the intended application of the chain. By way of example only, the various components may comprise forged steel, cast steel, spring steel, composite steel, plastic, other suitable materials and combinations thereof. Each of the components may comprise the same material, or alternatively, different components may comprise different materials. In addition, by way of example only the flight arms 53, 54 or any other suitable components, may be made of composite steel and plastic, urethane, or other material that can reduce noise levels during operation, although this is not required.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

What is claimed is:

1. A conveyor chain comprising:
a plurality of side link assemblies and flight arm assemblies coupled together to form an elongated chain;
at least one flight arm assembly including a pair of opposing flight arms positioned on either side of the chain, the flight arms each comprising:
an elongated body and an integral base formed with and extending from the integral base;
a vertical sprocket opening formed in the integral base to extend vertically through the integral base, the vertical sprocket opening being configured for engaging a tooth of a drive sprocket to drive the flight arm;
integral bases of the opposing flight arms configured to engage a respective tooth of a drive sprocket positioned on either side of the chain for driving the flight arm assembly on both sides of the chain;
at least one side link assembly including a pair of opposing side straps positioned on either side of the chain, the side straps each comprising,
a base;
at least a pair of side strap bosses extending outwardly from the base and
configured to engage a tooth of a drive sprocket to drive the side strap, each side strap including at least one opening extending through the base and at least one of the side strap bosses;
at least one connecting pin configured to extend through openings of opposing side straps to connect the side straps, the connecting pin including a groove formed at each of the ends thereof that is exposed when the connecting pin connects the opposing side straps;
a removable retaining ring positioned at an end of the connecting pin and being expandable to be positioned around an end of the connecting pit and then to engage the groove to secure the connecting pin in a side strap;
side strap bosses of the opposing side straps configured to engage a respective tooth of a drive sprocket positioned on either side of the chain for driving the side link assembly on both sides of the chain.

2. The conveyor chain of claim 1 comprising a removable retaining ring positioned at each of the ends of the connecting pin to engage a respective groove.

3. The conveyor chain of claim 1 wherein the retaining ring includes at least one of an external retaining ring or a spiral retaining ring.

4. The conveyor chain of claim 1, the side link assembly further including at least a pair of connecting pins and the opposing side straps each including at least a pair of openings extending through the base and side strap bosses and configured to receive the connecting pins.

5. The conveyor chain of claim 1 wherein the side strap bosses of the pair are positioned at opposite ends of the side strap base.

6. The conveyor chain of claim 1 further comprising at least one universal connector assembly, the universal connector assembly positioned between a flight arm assembly and a side link assembly;
the at least one universal connector assembly including:
a universal pin;
a universal link having an upper lip and a lower lip and corresponding vertical thru-holes configured to receive at least a portion of the universal pin, and a connecting portion extending between the upper lip and the lower lip and forming an opening there through, the connecting portion forming a horizontal bore;
a connector link having a projecting member with a vertical bore configured to receive at least a portion of the universal pin, the projecting member being configured to be positioned between the upper lip and the lower lip of the universal link, and including horizontal bore extending laterally through the connector link;
the universal pin coupling the connector link and universal link together to form the universal connector assembly;
at least one of the universal link horizontal bore, the connector link vertical bore or the connector link horizontal bore being hardened with respect to the link.

7. The conveyor chain of 6 wherein each of the universal link horizontal bore, the connector link vertical bore and the connector link horizontal bore are hardened with respect to the link.

8. The conveyor chain of 6 wherein the at least one bore is induction hardened.

9. The conveyor chain of 6 wherein the at least one bore is hardened to a hardness rating of 50-54 Rc.

10. A conveyor chain comprising:
a plurality of side link assemblies and flight arm assemblies coupled together with universal connector assemblies to form an elongated chain;
at least one flight arm assembly including a pair of opposing flight arms positioned on either side of the chain, the flight arms each comprising:
an elongated body and an integral base formed with and extending from the integral base;
a vertical sprocket opening formed in the integral base to extend vertically through the integral base, the vertical sprocket opening being configured for engaging a tooth of a drive sprocket to drive the flight arm;
integral bases of the opposing flight arms configured to engage a respective tooth of a drive sprocket positioned on either side of the chain for driving the flight arm assembly on both sides of the chain;
at least one side link assembly including a pair of opposing side straps positioned on either side of the chain, the side straps each comprising,
a base;
at least a pair of side strap bosses extending outwardly from the base and
configured to engage a tooth of a drive sprocket to drive the side strap;
side strap bosses of the opposing side straps configured to engage a respective tooth of a drive sprocket positioned on either side of the chain for driving the side link assembly on both sides of the chain;
at least one universal connector assembly including:
a universal pin;
a universal link having an upper lip and a lower lip and corresponding vertical thru-holes configured to receive at least a portion of the universal pin, and a connecting portion extending between the upper lip and the lower lip and forming an opening there through, the connecting portion forming a horizontal bore;
a connector link having a projecting member with a vertical bore configured to receive at least a portion of the universal pin, the projecting member being configured to be positioned between the upper lip and the lower lip of the universal link, and including horizontal bore extending laterally through the connector link;
the universal pin coupling the connector link and universal link together to form the universal connector assembly;
at least one of the universal link horizontal bore, the connector link vertical bore or the connector link horizontal bore being hardened with respect to the link.

11. The conveyor chain of 10 wherein each of the universal link horizontal bore, the connector link vertical bore and the connector link horizontal bore are hardened with respect to the link.

12. The conveyor chain of 10 wherein the at least one bore is induction hardened.

13. The conveyor chain of 10 wherein the at least one bore is hardened to a hardness rating of 50-54 Rc.

14. The conveyor chain of 10, each side strap including at least one opening extending through the base and at least one of the side strap bosses
at least one connecting pin configured to extend through openings of opposing side straps to connect the side straps, the connecting pin including a groove formed at each of the ends thereof that is exposed when the connecting pin connects the opposing side straps;
a removable retaining ring positioned at an end of the connecting pin and being expandable to be positioned around an end of the connecting pin and then to engage the groove to secure the connecting pin in a side strap.

15. The conveyor chain of claim 1 wherein the retaining ring includes at least one of an external retaining ring or a spiral retaining ring.

16. A conveyor chain comprising:
a plurality of side link assemblies and flight arm assemblies coupled together to form an elongated chain;
at least one flight arm assembly including a pair of opposing flight arms positioned on either side of the chain, the flight arms each comprising:
an elongated body and an integral base formed with and extending from the integral base;
a vertical sprocket opening formed in the integral base to extend vertically through the integral base, the vertical sprocket opening being configured for engaging a tooth of a drive sprocket to drive the flight arm;
the elongated body including a plurality of apertures formed therein;
urethane material formed over at least a portion of the elongated body and extending through the apertures;

integral bases of the opposing flight arms configured to engage a respective tooth of a drive sprocket positioned on either side of the chain for driving the flight arm assembly on both sides of the chain;

at least one side link assembly including a pair of opposing side straps positioned on either side of the chain, the side straps each comprising, a base;

at least a pair of side strap bosses extending outwardly from the base and configured to engage a tooth of a drive sprocket to drive the side strap, each side strap including at least one opening extending through the base and at least one of the side strap bosses;

side strap bosses of the opposing side straps configured to engage a respective tooth of a drive sprocket positioned on either side of the chain for driving the side link assembly on both sides of the chain.

17. The conveyor chain of claim 16 further comprising urethane material formed over most of the elongated body and extending through the apertures.

18. The conveyor chain of claim 16 wherein at least two apertures of the plurality of apertures have different dimensions.

19. The conveyor chain of claim 16 further comprising at least one flight pin extending between opposing flight arms to couple the integral bases of the flight arms and at least one connecting pin extending between opposing side straps to couple the side strap bosses of the side straps.

20. The conveyor chain of claim 16 wherein the elongated body of a flight arm includes a substantially flat bottom surface.

* * * * *